(12) United States Patent
Mabuchi

(10) Patent No.: US 10,044,947 B2
(45) Date of Patent: Aug. 7, 2018

(54) ELECTRONIC APPARATUS AND DRIVING METHOD THEREFOR

(71) Applicant: Sony Corporation, Tokyo (JP)

(72) Inventor: Keiji Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/152,349

(22) Filed: May 11, 2016

(65) Prior Publication Data

US 2016/0255287 A1 Sep. 1, 2016

Related U.S. Application Data

(63) Continuation of application No. 13/484,494, filed on May 31, 2012.

(30) Foreign Application Priority Data

Jun. 21, 2011 (JP) .................................. 2011-137653

(51) Int. Cl.
*H04N 5/347* (2011.01)
*H04N 5/343* (2011.01)
(Continued)

(52) U.S. Cl.
CPC ............. *H04N 5/347* (2013.01); *H04N 5/343* (2013.01); *H04N 5/353* (2013.01);
(Continued)

(58) Field of Classification Search
None
See application file for complete search history.

(56) References Cited

U.S. PATENT DOCUMENTS

2005/0179144 A1  8/2005  Hori
2005/0189472 A1  9/2005  Asaba
(Continued)

FOREIGN PATENT DOCUMENTS

CN  101600057 A  12/2009
JP  2005-244995 A  9/2005
(Continued)

OTHER PUBLICATIONS

Japanese Office Action dated Apr. 21, 2015, in connection with Japanese Application No. 2011-137653.
(Continued)

*Primary Examiner* — Roberto Velez
*Assistant Examiner* — Quan Pham
(74) *Attorney, Agent, or Firm* — Michael Best & Friedrich LLP

(57) ABSTRACT

An electronic apparatus includes: a pixel array section in which pixels including photoelectric conversion sections that generate signal charges corresponding to amounts of light, charge accumulation sections that receive the signal charges from the corresponding photoelectric conversion sections and that are shared thereby, and pixel transistors that read out the signal charges generated by the corresponding photoelectric conversion sections and that are shared thereby are two-dimensionally arranged in a matrix; a solid-state image capture device including a scanner that can drive the pixels so that exposure periods of all of the pixels are simultaneously started, that can drive the pixels so that the exposure periods of all of the pixels are simultaneously ended, and that sequentially selects and scans the pixels in readout periods; and a mechanical shutter that determines an end of the exposure periods for still-image shooting.

16 Claims, 13 Drawing Sheets

(51) Int. Cl.
*H04N 5/353* (2011.01)
*H04N 5/3745* (2011.01)
*H04N 5/372* (2011.01)
*H04N 9/04* (2006.01)

(52) U.S. Cl.
CPC ....... *H04N 5/3532* (2013.01); *H04N 5/37213* (2013.01); *H04N 5/37457* (2013.01); *H04N 9/045* (2013.01)

(56) References Cited

U.S. PATENT DOCUMENTS

| | | | |
|---|---|---|---|
| 2006/0044437 A1 | 3/2006 | Shah | |
| 2007/0013798 A1 | 1/2007 | Ahn et al. | |
| 2009/0108176 A1 | 4/2009 | Blanquart | |
| 2009/0167911 A1 | 7/2009 | Takane | |
| 2009/0251556 A1* | 10/2009 | Mabuchi | H01L 27/14621 348/222.1 |
| 2009/0251582 A1 | 10/2009 | Oike | |
| 2009/0303362 A1 | 12/2009 | Ebihara | |
| 2010/0091158 A1 | 4/2010 | Yamashita | |
| 2010/0188518 A1* | 7/2010 | Inuiya | H04N 5/347 348/220.1 |
| 2010/0194936 A1 | 8/2010 | Kanbe | |
| 2010/0283879 A1* | 11/2010 | Inoue | H04N 5/232 348/296 |
| 2010/0309351 A1 | 12/2010 | Smith et al. | |
| 2011/0007194 A1* | 1/2011 | Fujisawa | H01L 27/1463 348/294 |
| 2011/0032403 A1 | 2/2011 | Mabuchi | |
| 2011/0080493 A1 | 4/2011 | Kono | |
| 2015/0076323 A1* | 3/2015 | Mabuchi | H01L 27/14609 250/208.1 |

FOREIGN PATENT DOCUMENTS

| | | | |
|---|---|---|---|
| JP | 2007-150008 A | | 6/2007 |
| JP | 2007150008 A | * | 6/2007 |
| JP | 2007-243731 A | | 9/2007 |
| JP | 2009-268083 A | | 11/2009 |
| JP | 2010-003869 A | | 1/2010 |
| JP | 2010-283629 A | | 12/2010 |
| KR | 20070009278 A | | 1/2007 |
| KR | 20090127233 A | | 12/2009 |

OTHER PUBLICATIONS

Chinese Office Action dated Jul. 28, 2016 for corresponding Chinese Application No. 201210211658.8.
Chinese Office Action dated Feb. 24, 2017 for corresponding Chinese Application No. 201210211658.8.
Korean Office Action dated Apr. 24, 2018 for corresponding Korean Application No. 10-2012-0063030.

* cited by examiner

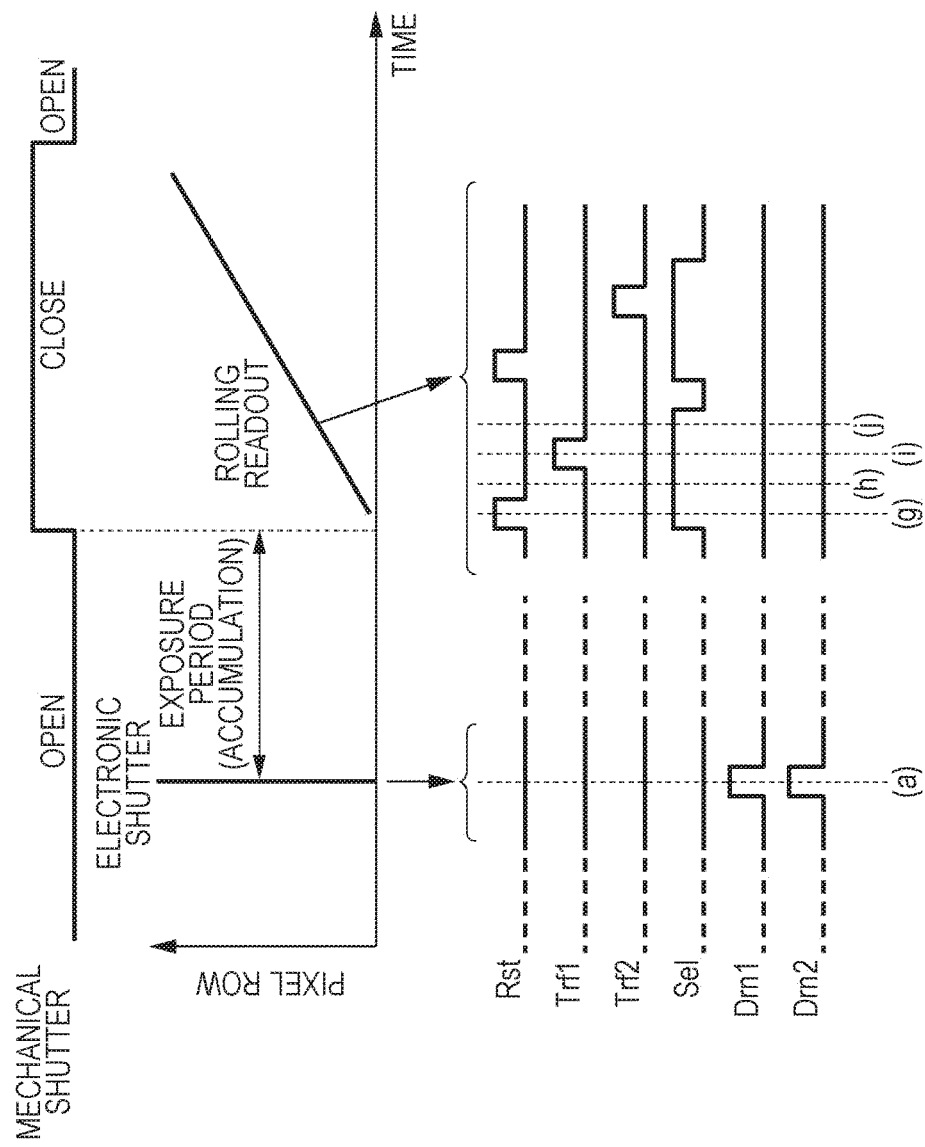

ELECTRONIC APPARATUS AND DRIVING METHOD THEREFOR

CROSS REFERENCE TO RELATED APPLICATIONS

The present application is a Continuation of application Ser. No. 13/484,494, filed May 31, 2012, which claims the benefit of Japanese Priority Patent Application JP 2011-137653 filed Jun. 21, 2011, the entire contents of which are incorporated herein by reference.

BACKGROUND

The present disclosure relates to electronic apparatuses having solid-state image capture devices. In particular, the present disclosure relates to an electronic apparatus having a solid-state image capture device with a global shutter function. In addition, the present disclosure relates to a driving method for the electronic apparatus.

Typically, CMOS (complementary metal-oxide semiconductor) solid-state image capture devices employ a system for sequentially reading out signal charges, generated and accumulated by light-receiving sections in pixels arranged in a two-dimensional matrix, row by row. In this case, the timings of the exposures at the light-receiving sections of the pixels are determined by the start and end of reading out the signal charges. Thus, the timings of the exposures at the pixels are different from each other. Hence, when such a CMOS solid-state image capture device is used to capture an image of a fast-moving subject, there is a problem in that a captured image of the subject is distorted.

In order to overcome such a problem, a simultaneous image-capture function (a global shutter function) that realizes simultaneity of accumulation of the signal charges has been proposed in recent years and the number of applications of CMOS solid-state image capture devices having the global shutter function is also increasing.

In order to ensure that the signal charges generated by the light-receiving sections are stored until the signal charges are read out, the CMOS solid-state image capture devices having the global shutter function typically have light-blocking charge accumulation sections. In typical CMOS solid-state image capture devices, the charge accumulation sections are often configured using floating diffusion sections originally included in the pixels. Japanese Unexamined Patent Application Publication No. 2009-268083 discloses a configuration using two elements, i.e., a CCD (charge coupled device) type charge-holding capacitor section and a floating diffusion section, as a charge accumulation section to increase the number of saturation electrons.

In typical CMOS solid-state image capture devices, a pixel-sharing system in which multiple pixels share a pixel circuit is available in order to achieve higher densities of the pixels. In the solid-state image capture devices having the global shutter function, when the pixel sharing system is used for a configuration in which the floating diffusion sections are used as charge-holding capacitor sections, signals of the pixels are mixed in the floating diffusion sections. Consequently, it is difficult to employ the pixel sharing system, and thus there is a problem in a reduction in the sizes of the pixels.

In the solid-state image-capture device disclosed in Japanese Unexamined Patent Application Publication No. 2009-268083, since the signal charges are also accumulated in the CCD-type charge-holding capacitor sections and the floating diffusion sections, it is difficult to employ the pixel sharing system.

SUMMARY

In view of the foregoing, it is desirable to provide an electronic apparatus that has a solid-state image capture device having a global shutter function and that has a configuration in which multiple pixels share pixel circuits, to thereby reduce the sizes of the pixels.

According to an embodiment of the present disclosure, there is provided an electronic apparatus. The electronic apparatus includes a pixel array section in which pixels are two-dimensionally arranged in a matrix, a solid-state image capture device having a scanner, and a mechanical shutter. The pixels include photoelectric conversion sections that generate signal charges corresponding to amounts of light and pixel transistors and charge accumulation sections that are shared by the corresponding photoelectric conversion sections. The pixel transistors are transistors for transferring and reading out the signal charges accumulated by the photoelectric conversion sections. In the exposure periods of the signal charges, the scanner is capable of driving the pixels so that exposure periods of all of the pixels are simultaneously started, is capable of driving the pixels so that the exposure periods of all of the pixels are simultaneously ended, and sequentially selects and scans the pixels in readout periods. For still-image shooting, the mechanical shutter determines an end of the exposure periods.

In the disclosed electronic apparatus, a pixel-sharing system is realized for a solid-state image capture device having a global shutter function. In addition, since the mechanical shutter is combined with the solid-state image capture device employing the pixel-sharing system, it is possible to achieve a global shutter function for still-image shooting while realizing miniaturization due to the pixel-sharing.

According to an embodiment of the present disclosure, there is provided a driving method for an electronic apparatus. In the electronic apparatus having the above-described configuration, for moving-image shooting, the exposure periods of all of the pixels are simultaneously started by discharging the signal charges accumulated by the photoelectric conversion sections. Then, the exposure periods of all of the pixels are simultaneously ended by transferring the signal charges generated and accumulated by the photoelectrical conversion sections in the exposure periods to the corresponding charge accumulation sections. For still-image shooting, the exposure periods of all of the pixels are simultaneously started by discharging the signal charges accumulated by the photoelectric conversion sections and the exposure periods of all of the pixels are ended by closing the mechanical shutter.

According to the disclosed driving method for the electronic apparatus, since the mechanical shutter is employed for the solid-state image capture device having the pixel-sharing system and the mechanical shutter function, moving-image shooting and still-image shooting can be actually performed with a global shutter.

According to the present disclosure, in the solid-state image capture device having the global shutter function, since the multiple pixels share the pixel circuits, the sizes of the pixels are reduced to thereby achieve miniaturization of the electronic apparatus.

BRIEF DESCRIPTION OF THE DRAWINGS

FIG. 13 is a timing chart for a case in which the electronic apparatus according to the second embodiment of the present disclosure shoot a still image.

DETAILED DESCRIPTION OF EMBODIMENTS

An electronic apparatus according to an embodiment of the present disclosure and a solid-state image capture device used for the electronic apparatus will be described below by way of example with reference to FIGS. 1 to 13. Embodiments of the present disclosure are described in the order listed below. The present disclosure is not limited to the examples described below.

1. First Embodiment: Electronic Apparatus and Solid-State Image Capture Device
   1-1. Configuration of Electronic Apparatus
   1-2. Overall Configuration of Solid-State Image Capture Device
   1-3. Configuration of Major Portion of Solid-State Image Capture Device
   1-4. Driving Method for Electronic Apparatus: Moving Image
   1-5. Driving Method for Electronic Apparatus: Still Image
   1-6. Layout of Pixels
2. Second Embodiment: Electronic Apparatus and Solid-State Image Capture Device

1. First Embodiment

Electronic Apparatus and Solid-State Image Capture Device

[1-1. Configuration of Electronic Apparatus]

An electronic apparatus according to a first embodiment of the present disclosure will be described first.

Figure 1:
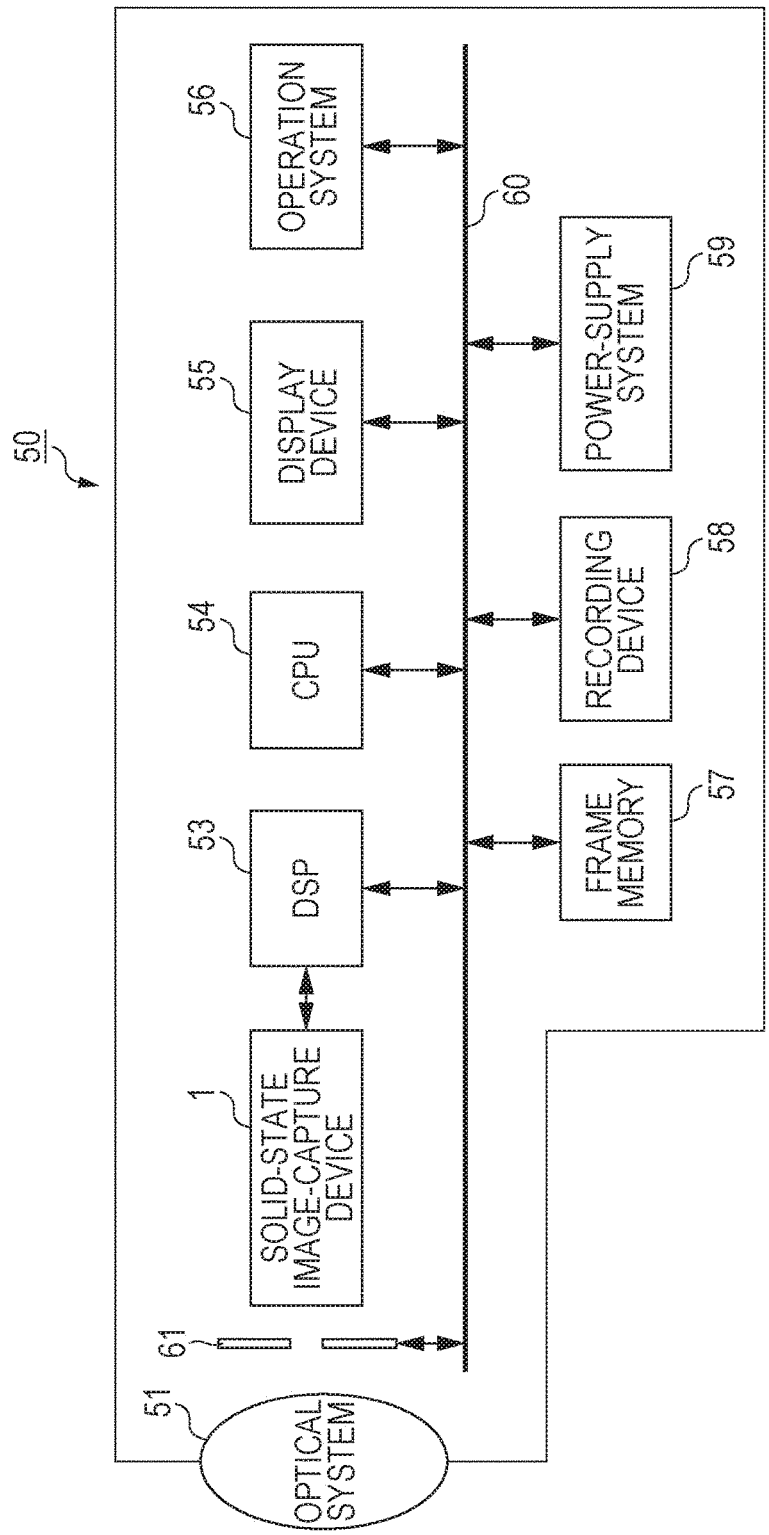
FIG. 1 is a schematic block diagram illustrating an electronic apparatus according to a first embodiment of the present disclosure.

FIG. 1 is a schematic block diagram illustrating an electronic apparatus according to a first embodiment of the present disclosure. In the present embodiment, a camera is implemented as one example of the electronic apparatus. An electronic apparatus 50 according to the present embodiment includes an optical lens group (an optical system) 51, a mechanical shutter 61, a solid-state image-capture device 1, a DSP (digital signal processor) 53, a frame memory 57, and a CPU (central processing unit) 54. The electronic apparatus 50 further includes a display device 55, a recording device 58, an operation system 56, a power-supply system 59, and so on. The mechanical shutter 61, the DSP 53, the frame memory 57, the CPU 54, the display device 55, the recording device 58, the operation system 56, and the power-supply system 59 are connected to a common bus line 60.

The optical lens group 51 guides image light (incident light) from a subject to an image-capture plane (a pixel array section or a pixel section) of the solid-state image-capture device 1. The mechanical shutter 61 controls a period in which light is emitted to the solid-state image-capture device 1 and a period in which light is shut off. The solid-state image-capture device 1 converts image light, formed at the image-capture plane by the optical lens group 51, into electrical signals for respective pixels. The DSP 53 controls the solid-state image-capture device 1, receives the signals therefrom, and generates image signals. The frame memory 57 is a memory used for temporarily storing the image signals processed by the DSP 53.

The display device 55 displays the image signals output as a result of the processing of the DSP 53. The recording device 58 records the image signals to, for example, a magnetic tape, a magnetic disk, an optical disk, or a memory card. The operation system 56 is used to operate the camera. The power-supply system 59 serves to supply power for driving the solid-state image-capture device 1 and the mechanical shutter 61. The CPU 54 controls the operations of the above-described elements of the electronic apparatus 50.

[1-2. Overall Configuration of Solid-State Image Capture Device]

Next, a description will be given of the solid-state image-capture device 1 incorporated into the electronic apparatus 50 according to the present embodiment.

Figure 2:
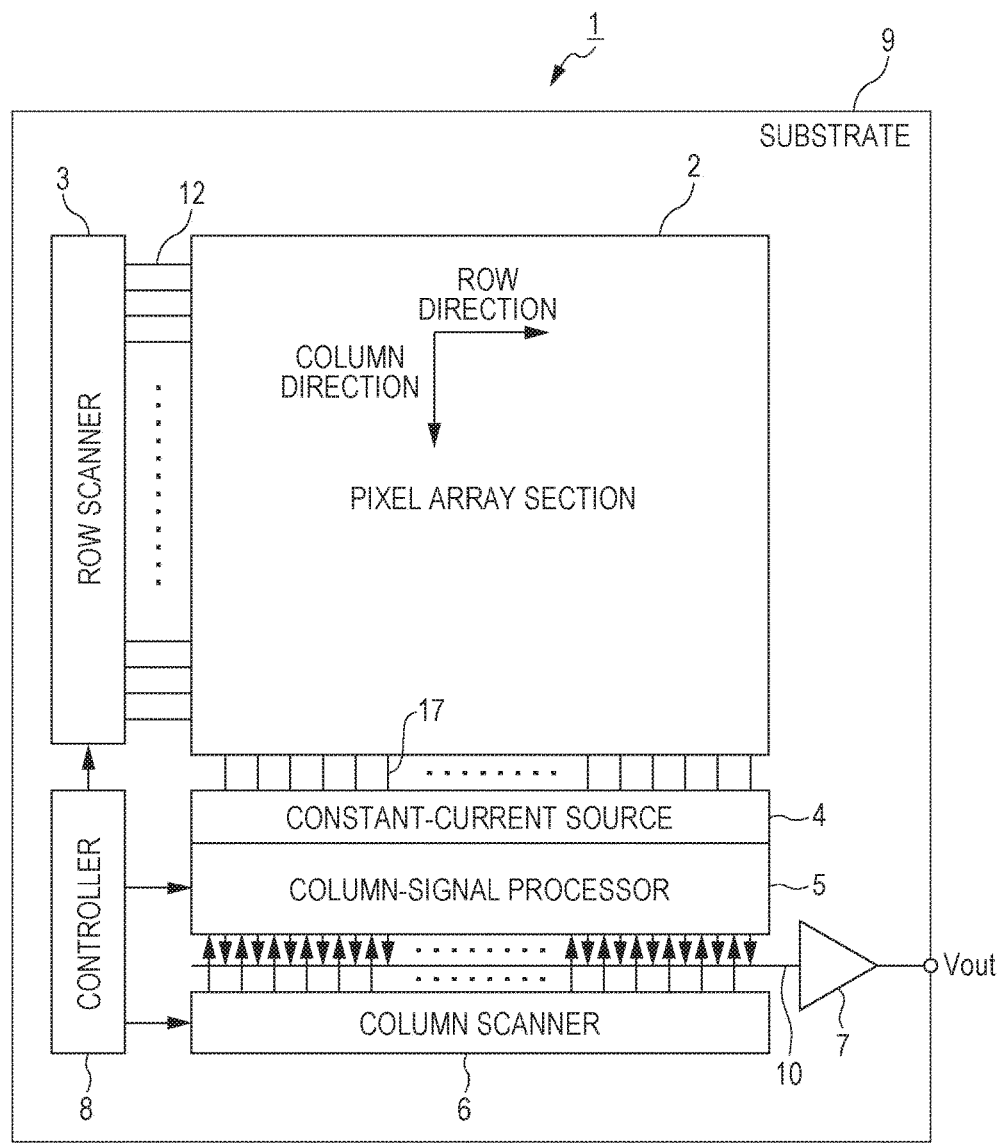
FIG. 2 is a schematic block diagram illustrating an overall CMOS solid-state image capture device according to the first embodiment of the present disclosure.

FIG. 2 is a schematic block diagram illustrating an overall CMOS solid-state image-capture device 1 according to the embodiment of the present disclosure.

The solid-state image-capture device 1 according to the present embodiment has a pixel array section 2 and peripheral circuit sections. The pixel array section 2 is formed on a silicon substrate 9 and the peripheral circuit sections are integrated on the same substrate 9 on which the pixel array section 2 is formed. The peripheral circuit sections are constituted by, for example, a row scanner 3, a constant-current source 4, a column-signal processor 5, a column scanner 6, an output processor 7, a controller 8, and so on.

The pixel array section 2 has a structure in which unit pixels (which may simply be referred to as "pixels" hereinafter) having photoelectric conversion elements are two dimensionally arranged in row and column directions, i.e., in a matrix. Each photoelectric conversion element generates light charge (a light signal) having an amount of charge corresponding to the amount of the incident light and accumulates the generated light charge therein. The "row direction" as used herein refers to a direction in which the pixels in pixel rows are arranged (i.e., in a horizontal direction) and the "column direction" as used herein refers to a direction in which the pixels in pixel columns are arranged (i.e., in a vertical direction). Details of the specific circuit configuration of the pixel unit are described below.

In the pixel array section 2, with respect to the pixel array in the matrix, pixel drive lines 12 are wired in the corresponding pixel rows along the row direction and vertical signal lines 17 are wired in the corresponding pixel columns along the column direction. The pixel drive lines 12 transmit drive signals for performing driving when signals are read out from the pixels. Although each of the pixel drive lines 12 is illustrated in FIG. 2 as being one line, it may be constituted by multiple lines. One end of each of the pixel drive line 12 is connected to an output terminal in the corresponding row in the row scanner 3.

The row scanner 3 includes a shift register, an address decoder, and so on. The row scanner 3 may simultaneously drive all of the pixels in the pixel array section 2 or may drive the pixels row by row. That is, the row scanner 3 and the controller 8, which controls the row scanner 3, constitute a drive section for driving the pixels in the pixel array section 2. Although a specific configuration of the row scanner 3 is not illustrated, it typically has a two scan systems, i.e., a readout scanning system and a sweep scanning system.

The readout scanning system sequentially selects and scans the unit pixels in the pixel array section 2 row by row in order to read out signals from the unit pixels. The signals read from the unit pixels are analog signals. With respect to the readout row to be subjected to the readout scanning performed by the readout scanning system, the sweep scanning system performs sweep scanning earlier than the readout scanning by an amount of time corresponding to the shutter speed.

As a result of the sweep scanning performed by the sweep scanning system, unwanted charges are swept from the photoelectrical conversion elements in the unit pixels in the corresponding row, so that the photoelectrical conversion elements are reset. Through the unwanted-charge sweeping (resetting) performed by the sweep scanning system, the so-called "electronic shutter operation" is performed. The "electronic shutter operation" as used herein refers to an operation for dumping light charges of the photoelectric conversion elements and re-starting exposure (i.e., re-starting accumulation of light charges).

The pixel scanning performed by the readout scanning system and the sweep scanning system is described below.

The signals output from the unit pixels in the pixel row selected and scanned by the row scanner 3 are input to the constant-current source 4 and the column-signal processor 5 through the vertical signal lines 17 in the respective pixel columns. The constant-current source 4 has a structure in which constant current sources 35 (see FIG. 3) are arranged for the respective pixel columns. The constant current sources 35 supply bias currents to the unit pixels through the respective vertical signal lines 17.

The column-signal processor 5 performs, for each pixel column in the pixel array section 2, predetermined signal processing on the signals output from the pixels in the selected row through the corresponding vertical signal line 17. Examples of the signal processing performed by the column-signal processor 5 include noise elimination processing involving CDS (correlated double sampling), signal amplification processing, and AD (analog-to-digital) conversion processing.

Those types of signal processing are merely exemplary and the signal processing performed by the column-signal processor 5 is not limited thereto. The column-signal processor 5 executes one or more of the types of signal processing. The signal processing performed by the column-signal processor 5 is one feature in the present embodiment and is described below in detail.

The column scanner 6 includes a shift register, an address decoder, and so on and sequentially selects unit circuits for the columns rows in the column-signal processor 5. As a result of the selection and scanning performed by the column scanner 6, signals subjected to the signal processing performed by the column-signal processor 5 with respect to the respective unit circuits are sequentially supplied to the output processor 7 through the horizontal signal line 10.

The output processor 7 performs predetermined processing on the signals selected by the column scanner 6 and input through the horizontal signal line 10 and outputs the resulting signals to outside of the substrate 9. Examples of the predetermined processing performed by the output processor 7 include processing for only buffering, signal processing for adjusting a black level before buffering, and signal processing for correcting variations between the pixel columns.

The controller 8 receives a clock signal supplied from outside of the substrate 9, a data signal for specifying an operation mode, and so on. The controller 8 also has a timing generating section for generating various timing signals on the basis of those signals. The various timing signals generated by the controller 8 are supplied to the peripheral circuit sections, such as the row scanner 3, the column-signal processor 5, and the column scanner 6, so as to perform drive control of the peripheral circuit sections.

[1-3. Configuration of Major Portion of Solid-State Image Capture Device]

Figure 3:
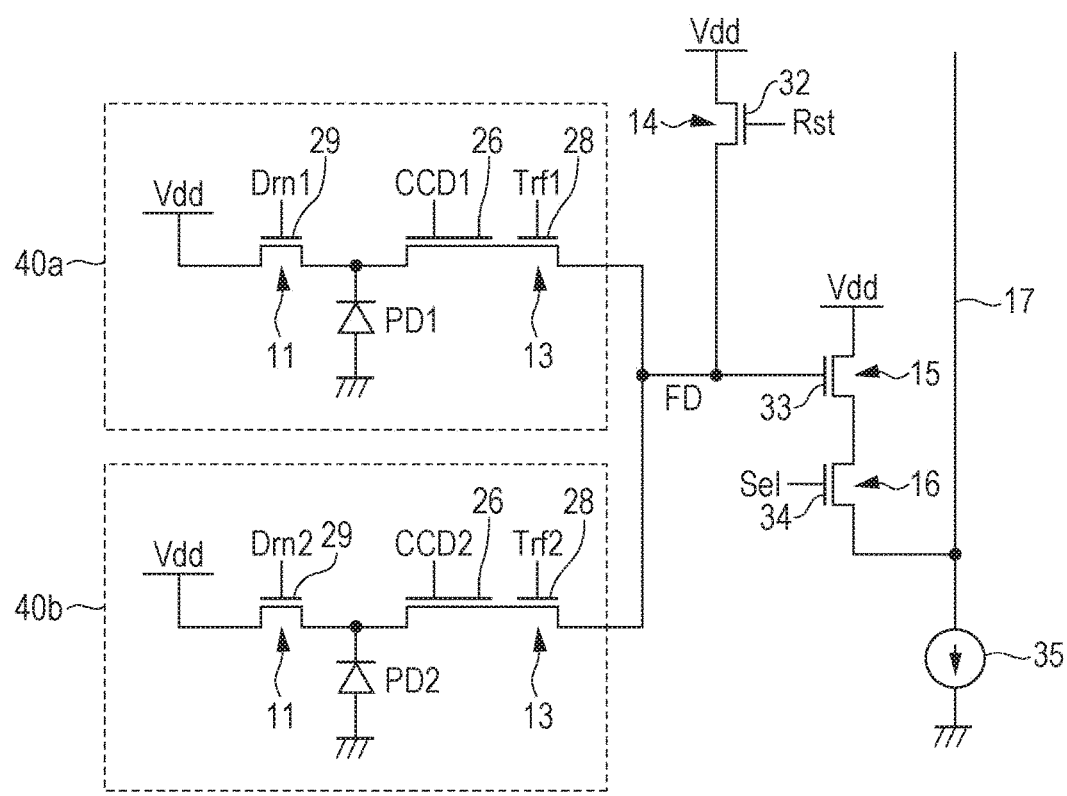
FIG. 3 illustrates a circuit configuration of the pixels in the solid-state image capture device according to the first embodiment of the present disclosure.
Figure 4:
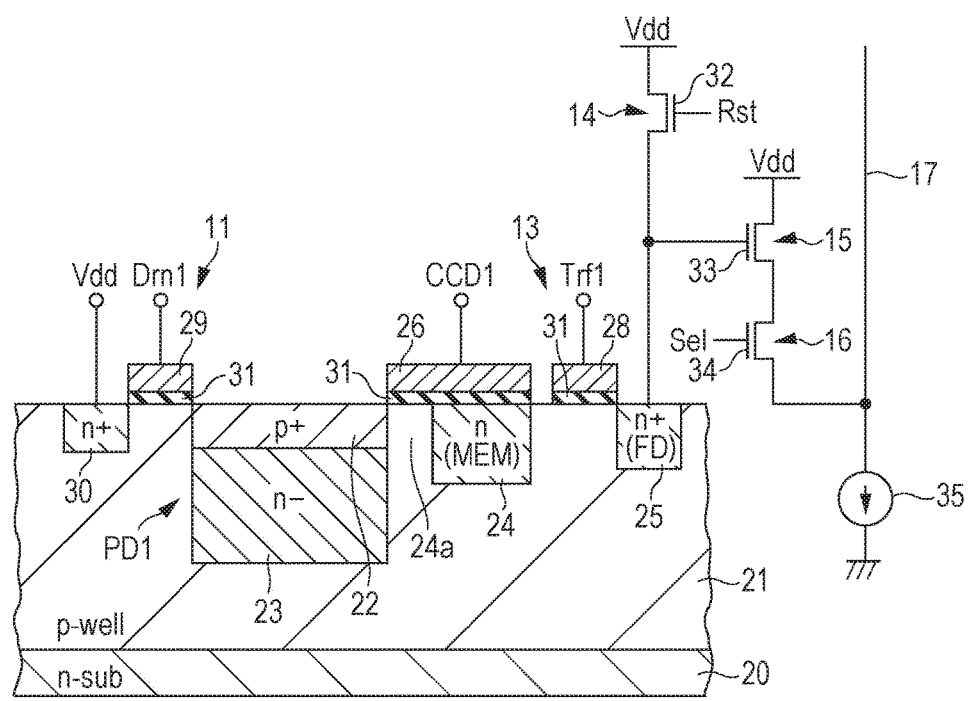
FIG. 4 is a cross-sectional view (and a partial circuit diagram) illustrating one of the pixels in the solid-state image-capture device according to the first embodiment of the present disclosure.

FIG. 3 is a diagram illustrating the circuit configuration of the pixels in the solid-state image-capture device 1 according to the present embodiment and FIG. 4 is a cross-sectional view (and a partial circuit diagram) illustrating one of the pixels in the solid-state image-capture device 1 according to the present embodiment. FIG. 3 illustrates two pixels (hereinafter referred to as "first pixel 40a" and a "second pixel 40b") that are adjacent to each other in the column direction. Since the first pixel 40a and the second pixel 40b have the same cross-sectional structure, FIG. 4 illustrates only the cross-sectional structure of the first pixel 40a.

As illustrated in FIGS. 3 and 4, the solid-state image-capture device 1 according to the present embodiment includes photoelectric conversion sections (hereinafter, photodiodes PD1 and PD2), first charge accumulation sections 24, and a second charge accumulation section 25 which are formed at a substrate 20. The solid-state image-capture device 1 further includes transfer transistors 13 for transferring and reading out charges, first reset transistors 11, a second reset transistor 14, an amplification transistor 15, and a selection transistor 16. The solid-state image-capture device 1 employs a pixel-sharing system in which the first pixel 40a and the second pixel 40b that are adjacent to each other share the second charge accumulation section 25, the second reset transistor 14, the amplification transistor 15, and the selection transistor 16.

As illustrated in FIGS. 3 and 4, the substrate 20 is a first-conductive-type semiconductor substrate, for example, an n-type semiconductor substrate. The substrate 20 has, at its surface side at which the pixels are formed, a well region 21 containing a second-conductive-type impurity region, for example, a p-type impurity region. The photodiode PD1 (PD2) included in the pixel, the first charge accumulation section 24, the second charge accumulation section 25, and source and drain regions included in pixel transistors are formed in the p-type well region 21.

The photodiode PD1 (PD2) is included in the corresponding photoelectric conversion element and is constituted by a p-type semiconductor region 22 formed at the surface of the substrate 20 and an n-type semiconductor region 23 formed in a layer below the p-type semiconductor region 22. In the present embodiment, a pn junction between the p-type semiconductor region 22 and the n-type semiconductor region 23 provides a main photodiode.

In the photodiode PD1 (PD2), a signal charge corresponding to the amount of incident light is generated and is accumulated in the n-type semiconductor region 23. In the present embodiment, the p-type semiconductor region 22 that serves as a hole accumulation layer is formed at the surface side of the photodiode PD1 (PD2). Thus, since the n-type semiconductor region 23 for accumulating the signal charge does not contact an interface where a large number of failures can occur, the amount of dark current is reduced.

The first charge accumulation section 24 is formed in a region adjacent to the photodiode PD1 (PD2) with a transfer gate portion 24a (included in the well region 21) interposed between the first charge accumulation section 24 and the photodiode PD1 (PD2). The first charge accumulation section 24 is implemented by an n-type semiconductor region formed in the depth direction from the surface of the substrate 20. A potential variation electrode 26 is formed immediately above the substrate 20 in which the first charge accumulation section 24 and the transfer gate portion 24a are formed, with an insulating film 31 interposed between the potential variation electrode 26 and the substrate 20.

In the first pixel 40a, upon supply of a desired potential variation pulse CCD1 to the potential variation electrode 26, the potentials of the transfer gate portion 24a and the first charge accumulation section 24 vary, so that the signal charge accumulated in the photodiode PD1 is transferred to the first charge accumulation section 24. Similarly, in the second pixel 40b, upon supply of a desired potential variation pulse CCD2 to the potential variation electrode 26, the potentials of the transfer gate portion 24a and the first charge accumulation section 24 vary, so that the signal charge accumulated in the photodiode PD2 is transferred to the first charge accumulation section 24.

As described above, the first charge accumulation section 24 has a CCD (charge coupled device) structure in which its potential is varied by the potential variation electrode 26 and serves as a capacitor section (MEM) for temporarily holding a signal charge. A potential barrier (corresponding to the transfer gate portion 24a) is provided between the photodiode PD1 (PD2) and the first charge accumulation section 24.

The second charge accumulation section 25 is formed in a region adjacent to the first charge accumulation section 24 with a transfer gate electrode 28 of the transfer transistor 13 interposed therebetween. The second charge accumulation section 25 is implemented by an n-type semiconductor region formed at the surface side of the substrate 20. For example, the second charge accumulation section 25 has an impurity content that is higher than that of the n-type semiconductor region 23 included in the photodiode PD1 (PD2) and provides the so-called "floating diffusion (FD) section".

The transfer transistor 13 is constituted by a source provided by the first charge accumulation section 24, a drain provided by the second charge accumulation section 25, and the transfer gate electrode 28 formed above the substrate 20 between the source and the drain with the insulating film 31 interposed between the transfer gate electrode 28 and the substrate 20.

In the first pixel 40a, upon supply of a transfer pulse Trf1 to the transfer transistor 13, the signal charge accumulated in the first charge accumulation section 24 in the first pixel 40a is transferred to the second charge accumulation section 25. In the second pixel 40b, upon supply of a transfer pulse Trf2 to the transfer transistor 13, the signal charge accumulated in the first charge accumulation section 24 in the second pixel 40b is transferred to the second charge accumulation section 25.

The first reset transistor 11 is constituted by a source provided by the photodiode PD1 (PD2), a drain (indicated as a discharge portion 30 in FIG. 4) connected to a power-source voltage Vdd, and a first reset gate electrode 29 formed between the source and the drain.

In the first pixel 40a, upon supply of a first reset pulse Drn1 to the first reset gate electrode 29 of the first reset transistor 11, the charge accumulated in the photodiode PD1 is discharged and it is reset.

In the second pixel 40b, upon supply of a first reset pulse Drn2 to the first reset gate electrode 29 of the first reset transistor 11, the charge accumulated in the photodiode PD2 is discharged and it is reset.

The second reset transistor 14 is constituted by a source provided by the second charge accumulation section 25, a drain connected to a power-source voltage Vdd, and a second reset gate electrode 32 formed between the source and the drain. In the second reset transistor 14, upon supply of a second reset pulse Rst to the second reset gate electrode 32, the potential of the second charge accumulation section 25 is reset to the power-source voltage Vdd.

The amplification transistor 15 is constituted by a drain to which the power-source voltage Vdd is supplied, a source that also serves as a drain of the selection transistor 16, and an amplification gate electrode 33 formed between the source and the drain. The potential of the second charge accumulation section 25 is supplied to the amplification gate electrode 33 of the amplification transistor 15. Thus, a pixel signal corresponding to the supplied potential is output to the drain.

The selection transistor 16 is constituted by a drain that also serves as the source of the amplification transistor 15, a source connected to the corresponding vertical signal line 17, and a selection gate electrode 34 formed between the source and the drain. Upon supply of a selection pulse Sel to the selection gate electrode 34 of the selection transistor 16, a pixel signal is output to the vertical signal line 17. The amplification transistor 15 is connected to the vertical signal line 17 to thereby form a source follower circuit in conjunction with the constant current source 35 connected to one end of the vertical signal line 17.

Although the second reset transistor 14, the amplification transistor 15, and the selection transistor 16 are illustrated in the circuit diagrams in FIGS. 3 and 4 and the cross-sectional structures thereof are not illustrated, those transistors are constituted by n-channel MOS transistors as in the other pixel transistors. That is, the sources and the drains included in the second reset transistor 14, the amplification transistor 15, and the selection transistor 16 are provided by n-type semiconductor regions formed at the surface of the substrate 20 and the gate electrodes are formed at the surface side of the substrate 20 with an insulating film interposed between.

[1-4. Driving Method for Electronic Apparatus: Moving Image]

Figure 5:
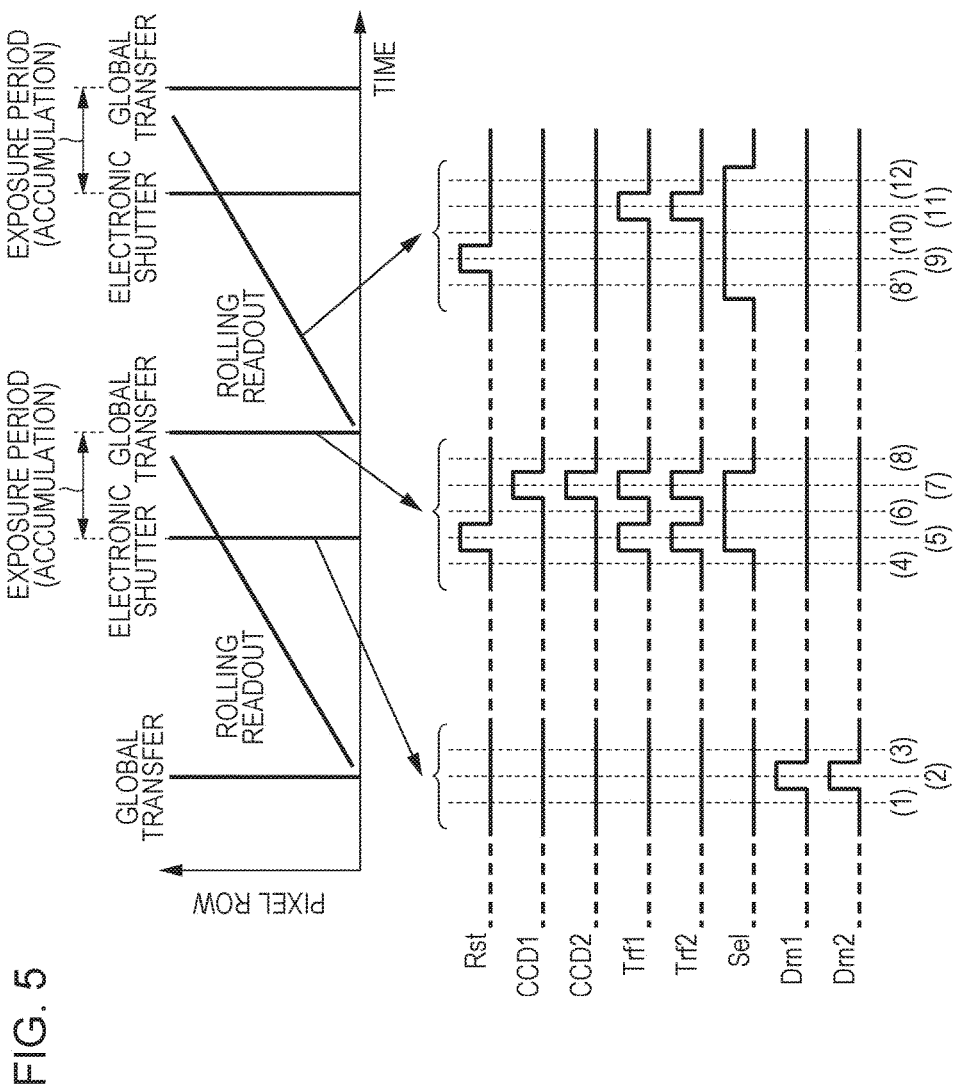
FIG. 5 is a timing chart for a case in which the electronic apparatus according to the first embodiment of the present disclosure shoot a moving image.
Figure 6:
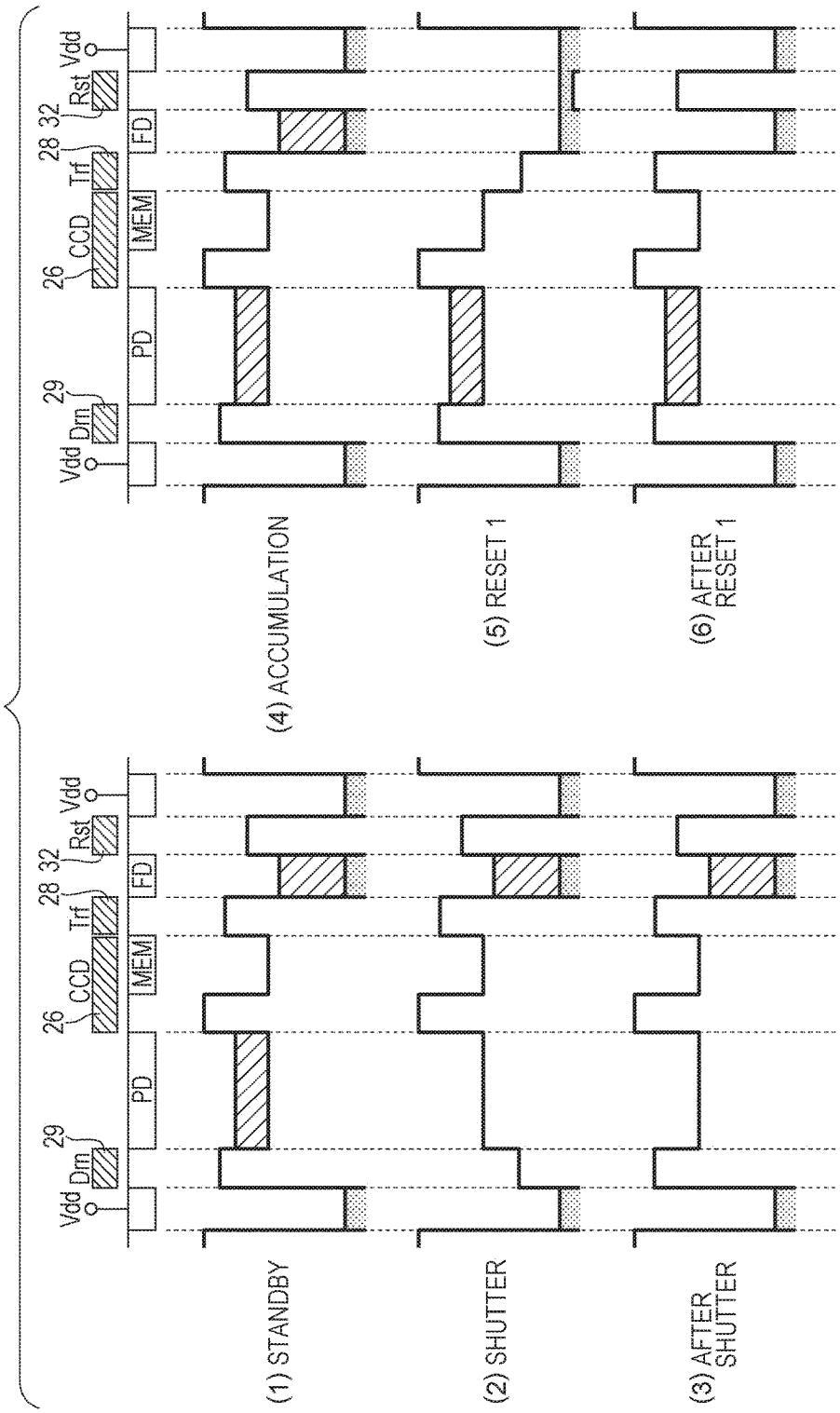
FIG. 6 is a cross-sectional potential diagram (part 1) corresponding to the timing chart illustrated in FIG. 5 and illustrating electron movement from exposure of unit pixels to readout thereof and transition of potentials.
Figure 7:
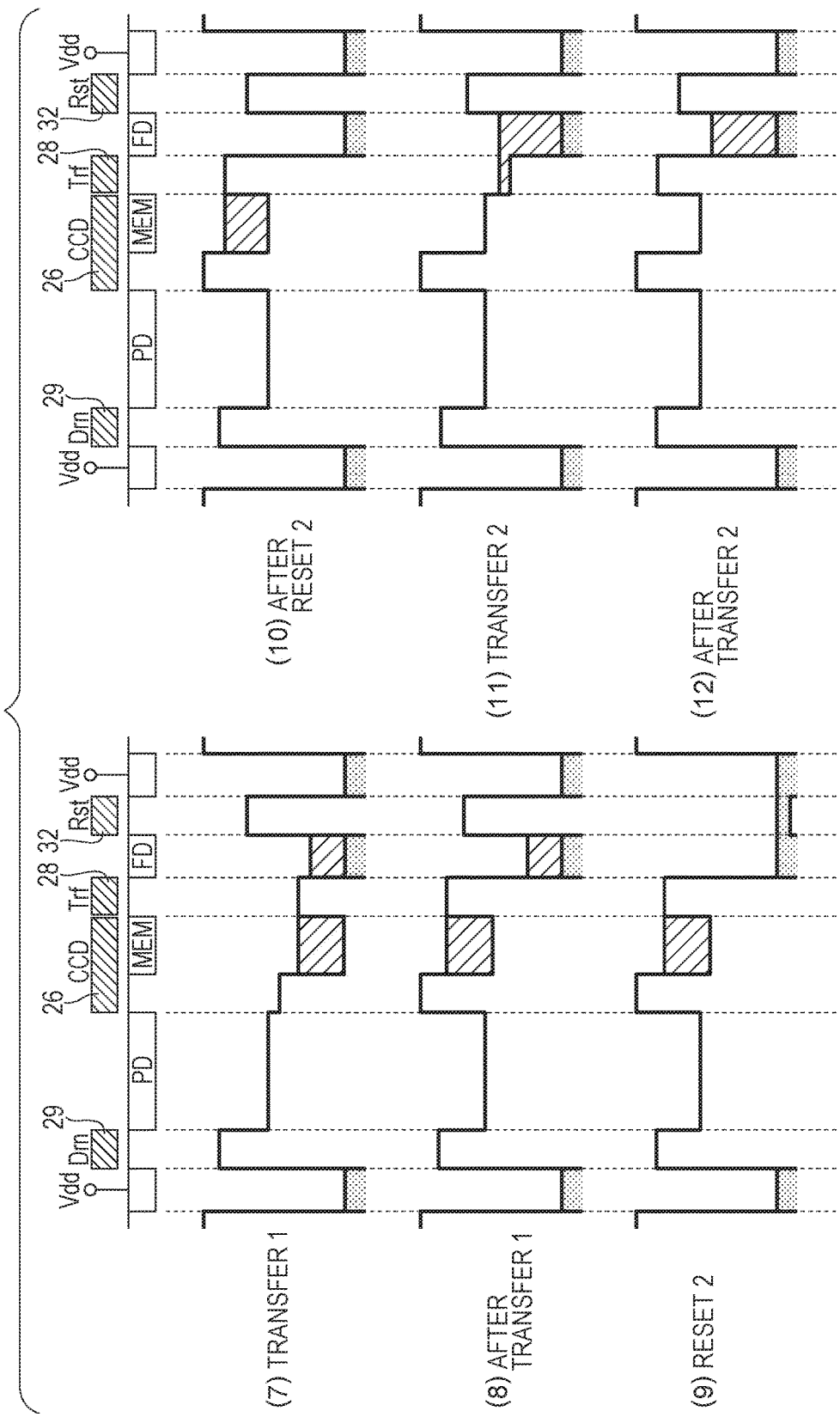
FIG. 7 is a cross-sectional potential diagram (part 2) corresponding to the timing chart illustrated in FIG. 5 and illustrating electron movement from exposure of the unit pixels to readout thereof and transition of the potentials.

FIG. 5 is a timing chart when the electronic apparatus 50 according to the present embodiment shoots a moving image. FIGS. 6 and 7 are cross-sectional potential diagrams corresponding to the timing chart and illustrating electron movement from exposure of the unit pixels to readout thereof and transition of the potentials. Operations (1) to (12) in FIG. 5 correspond to operations (1) to (12) in FIGS. 6 and 7. While FIGS. 6 and 7 illustrate only cross-sectional potential diagrams of the first pixel 40*a* and does not illustrate cross-section potential diagrams of the second pixel 40*b*, the cross-section potential diagrams of the second pixel 40*b* are also analogous to those in FIGS. 6 and 7 when the pixel transistors in the second pixel 40*b* are scanned. Moving-image shooting described below may or may not employ a mechanical shutter 61 included in the electronic apparatus 50.

In a standby state before start of the exposure, the first reset pulses Drn1 and Drn2, the potential variation pulses CCD1 and CCD2, the transfer pulses Trf1 and Trf2, the selection pulse Sel, and the second reset pulse Rst are not supplied (operation (1) in FIG. 5). As illustrated in operation (1) in FIG. 6, the standby state is a state in which signal charges are accumulated in the photodiodes PD1 and PD2 and the second charge accumulation section 25. The signal charges accumulated in the photodiodes PD1 and PD2 at this point are due to incident light that has entered after readout for a previous frame. The signal charge accumulated in the second charge accumulation section 25 is a remainder of the previous frame.

Next, in order to start the exposure, the first reset pulses Drn1 and Drn2 are supplied to turn on the first reset transistors 11 (operation (2) in FIG. 5). When the first reset transistors 11 are turned on, the signal charges accumulated in the photodiodes PD1 and PD2 are discharged toward the discharge portions 30 (connected to the power-source voltages Vdd), as illustrated in operation (2) in FIG. 6, so that the photodiodes PD1 and PD2 are reset.

Thereafter, the supply of the first reset pulses Drn1 and Drn2 is stopped, so that the first reset transistors 11 are turned off (operation (3) in FIG. 5). The operation for resetting the signal charges accumulated in the photodiodes PD1 and PD2 corresponds to the electronic shutter operation. After the first reset transistors 11 are turned off, the exposures at the photodiodes PD1 and PD2 are started.

After the start of the exposures, in a state in which a desired exposure period passes (operation (4) in FIG. 5), signal charges photoelectrically converted during the exposure period are accumulated in the photodiodes PD1 and PD2, as illustrated in operation (4) in FIG. 6. A reset gate portion is provided below each first reset gate electrode 29 and is adapted to provide a potential barrier that is lower than a potential barrier of the transfer gate portion 24*a* provided below the potential variation electrode 26. Thus, when the signal charge is generated to exceed the amount of saturation charge of the photodiode PD1 (PD2), the signal charge that overflows from the photodiode PD1 (PD2) is discharged toward the discharge portion 30, not toward the first charge accumulation section 24.

After operation (4) in FIG. 5, the second reset pulse Rst and the transfer pulses Trf1 and Trf2 are supplied, so that the second reset transistor 14 and the transfer transistors 13 are turned on (operation (5) in FIG. 5). As a result, the signal charge accumulated in the second charge accumulation section 25 is discharged toward the power-source voltage Vdd via the second reset transistor 14, as illustrated in operation (5) in FIG. 6. At this point, when the signal charges have also been accumulated in the first charge accumulation sections 24, the signal charges in the first charge accumulation sections 24 are similarly discharged toward the power-source voltage Vdd via the second reset transistor 14. In order to bring this operation close to the state of subsequent rolling readout, it is preferable that the selection pulse Sel be simultaneously supplied so that the selection transistor 16 is turned on.

After operation (5) in FIG. 5, the supply of the second reset pulse Rst and the transfer pulses Trf1 and Trf2 is stopped, so that the second reset transistor 14 and the transfer transistors 13 are turned off (operation (6) in FIG. 5). In this case, the signal charges in the first charge accumulation sections 24 and the second charge accumulation section 25 are in reset states, as illustrated in operation (6) in FIG. 6.

Next, the potential variation pulses CCD1 and CCD2 and the transfer pulses Trf1 and Trf2 are supplied, so that the potentials of the transfer gate portions 24*a* and the first charge accumulation sections 24 are increased and also the transfer transistors 13 are turned on (operation (7) in FIG. 5). As a result, during the exposure period, the signal charges accumulated in the photodiodes PD1 and PD2 are transferred to the first charge accumulation sections 24 and the second charge accumulation section 25, as illustrated in operation (7) in FIG. 7. The first charge accumulation sections 24 are formed so as to receive not all of the signal charges accumulated in the corresponding photodiodes PD1 and PD2. Thus, the signal charges in the photodiodes PD1 and PD2 are first transferred to the first charge accumulation sections 24 and signal charges that overflow from the first charge accumulation sections 24 are transferred to the second charge accumulation section 25 and are held thereby.

After the transfer of the signal charges, the supply of the potential variation pulses CCD1 and CCD2 and the transfer pulses Trf1 and Trf2 is stopped, the potentials of the portions below the potential variation electrodes 26 are returned to their original potentials, and the transfer transistors 13 are turned off (operation (8) in FIG. 5). At this point, when the selection pulse Sel has been supplied, the supply is simultaneously stopped. As a result, the transfer of the signal charges to the first charge accumulation sections 24 and the second charge accumulation section 25 is completed, as illustrated in operation (8) in FIG. 7.

The above-described series of operations is simultaneously performed at all of the pixels including the first pixel 40*a* and the second pixel 40*b*. That is, in operations (2) and (3) in FIG. 5, global exposure is started, and in operations (4) to (8) in FIG. 5, global transfer is performed, and then the exposure periods of all of the pixels are simultaneously ended.

Next, rolling readout is performed. In the rolling readout, operations are sequentially performed row by row. However, since the solid-state image capture device is configured so that the first pixel 40*a* and the second pixel 40*b* share the multiple pixel transistors, the signal charges in the first pixel 40*a* and the second pixel 40*b* in this case are simultaneously read out. That is, during moving-image shooting, the nth row in which the first pixel 40a and the second pixel 40b are formed is scanned. The pixels are in the state illustrated in operation (8) in FIG. 7, until the operation of the nth row comes next time.

When the turn of the nth row comes, the selection pulse Sel is supplied first. As a result, the selection transistor 16 is put into an ON state (operation (8') in FIG. 5). The potentials of the transfer transistors 13 at this point are the same as the potentials in operation (8) in FIG. 7. When the selection pulse Sel is turned on, the amplification transistor 15 amplifies, as a high-luminance signal, an output corresponding to the potential due to the signal charge accumulated in the second charge accumulation section 25 in the state in state (8) in FIG. 7 and outputs the high-luminance signal to the corresponding vertical signal line 17 via the selection transistor 16. The high-luminance signal output from the vertical signal line 17 is received by a column circuit (not illustrated).

Next, in a state in which the supply of the selection pulse Sel is continued, the second reset pulse Rst is supplied (operation (9) in FIG. 5). As a result, the second reset transistor 14 is put into the ON state, and the signal charge accumulated in the second charge accumulation section 25 is discharged toward the power-source voltage Vdd and is reset, as illustrated in operation (9) in FIG. 7. Thereafter, the supply of the second reset pulse Rst is stopped, so that the second reset transistor 14 is turned off, as illustrated in (10) in FIG. 5 and (10) in FIG. 7.

While the second reset transistor 14 is in the OFF state, an output corresponding to the potential of the second charge accumulation section 25 is received by the column circuit as a reset signal. The column circuit determines a difference between the previously obtained high-luminance signal and the reset signal. As a result, the column circuit holds a new high-luminance signal from which fixed-pattern noise was removed.

Next, in the state in which the selection pulse Sel is continuously supplied, the transfer pulses Trf1 and Trf2 are supplied (operation (11) in FIG. 5). As a result, the transfer transistors 13 are put into the ON state, so that the signal charges accumulated in the first charge accumulation section 24 are transferred to the second charge accumulation section 25, as illustrated in operation (11) in FIG. 7. After the transfer is completed, the supply of the transfer pulses Trf1 and Trf2 is stopped as illustrated in (12) in FIG. 5 and (12) in FIG. 7, so that the transfer transistors 13 are turned off.

In this state, the amplification transistor 15 amplifies, as a low-luminance signal, a pixel output corresponding to the potential due to the signal charge accumulated in the second charge accumulation section 25 and outputs the low-luminance signal to the corresponding vertical signal line 17 via the selection transistor 16. The low-luminance signal output from the vertical signal line 17 is received by the column circuit. The column circuit determines a difference between the reset signal obtained in state (10) in FIG. 7 and the low-luminance signal to perform correlated double sampling. As a result, the column circuit holds a new low-luminance signal from which fixed-pattern noise was removed.

The high-luminance signal and the low-luminance signal from which the fixed-pattern noise was removed and are held in the column circuit are output to the output processor 7 via the horizontal signal line 10. On the basis of the high-luminance signal and the low-luminance signal, the output processor 7 re-configures a signal corresponding to the signal charges generated and accumulated by the photodiodes PD1 and PD2 during the exposure period and outputs the re-configured signal. As a result, the readout of the pixels in the nth row is completed.

After the readout of the pixels in the nth row is completed, readout of the pixels in the (n+1)th row is performed. For readout of the pixels in the (n+1)th row, the pixel transistors are driven with operations that are similar to those in operations (8) to (12) in FIG. 5, to thereby make it possible to provide a low-luminance signal and a high-luminance signal.

In the present embodiment, the first and second pixels 40a and 40b that share the multiple pixel transistors are simultaneously driven, so that the signal charges accumulated in the two pixels are added and the resulting signal charge is read out as a pixel signal for a substantially single pixel. For today's digital still cameras, a still image typically has 10 million pixels, whereas a moving image even for HDTV (High-Definition TeleVision) has only 2 million pixels. Thus, since there are many moving-image applications in which the number of pixels may be reduced through the pixel addition, the pixel-sharing configuration may be employed for a solid-state image capture device having a global shutter function. Although the present embodiment has been given of an example in which the pixel addition between the sharing pixels is performed during moving-image shooting, a thin-out readout technique in which the signal charge in only one of the sharing pixels is read out, rather than the pixel addition technique, may also be employed if a reduction in the sensitivity or an increase in return noise is permitted.

In the solid-state image-capture device 1 according to the present embodiment, during the exposure period, the photoelectrically converted signal charges are accumulated in only the photodiodes PD1 and PD2, and after the exposure period is ended, the signal charges are transferred to the first charge accumulation sections 24 and the second charge accumulation section 25. Thus, compared to a typical solid-state image capture device that accumulates the signal charges in the photodiodes PD1 and PD2 and the first charge accumulation sections 24 during the exposure period, the areas of the first charge accumulation sections 24 can be reduced. Thus, when the areas of the unit pixels are assumed to be the same, the areas occupied by the photodiodes PD1 and PD2 can be increased and the sensitivity and the amounts of saturation charges can be increased.

In addition, in the solid-state image-capture device of the present embodiment, since the low-luminance signal and the high-luminance signal can be read out, the dynamic range can be increased.

In the solid-state image-capture device 1 according to the present embodiment, when the signal charges generated by the photodiodes PD1 and PD2 during the exposure period exceeds the amounts of saturation charges of the photodiodes PD1 and PD2, the signal charges overflows toward the drains of the corresponding first reset transistors 11.

Accordingly, there is no possibility that signal charges exceeding the amounts of saturation charges of the photodiodes PD1 and PD2 overflow toward the first charge accumulation sections 24 and/or the second charge accumulation section 25. The exposure can thus be started before the rolling readout is ended.

Thus, when the exposure is started before the rolling readout is ended and the global transfer is performed after the rolling readout is ended, the previous signal charges and the next signal charges do no mix in the first charge accumulation sections 24 and the second charge accumulation section 25.

According to the present embodiment, since the exposure is started before the rolling readout is ended, a smooth moving image without a time skip can be obtained and the sensitivity is improved. Since the generated signal charges are accumulated in only the photodiodes PD1 and PD2 in the manner described above, the solid-state image-capture device according to the present embodiment is configured such that the photodiodes PD1 and PD2 has increased areas and the first charge accumulation sections 24 have reduced areas. This configuration is effective for a driving method for starting the exposure period during the rolling readout.

In the present embodiment, the electronic shutter operation and the global transfer may be performed simultaneously to the degree to which there is no practical problem. When all of the pixels are driven completely simultaneously, a large amount of load is applied to a driver. Thus, in order to reduce the amount of load, a small time difference may be provided between an upper portion and a lower portion of the pixel array section 2.

[1-5. Driving Method for Electronic Apparatus: Still Image]

Figure 8:
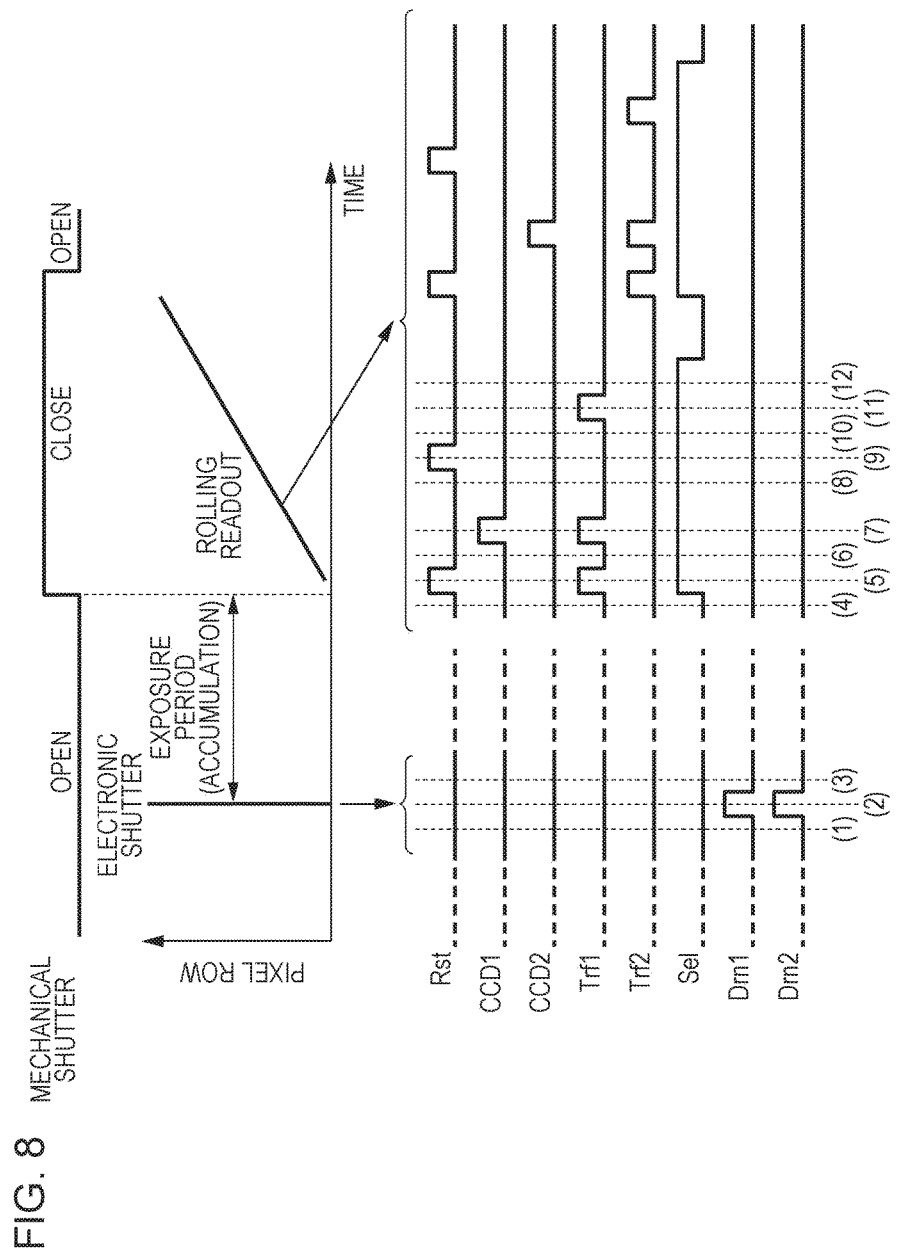
FIG. 8 is a timing chart for a case in which the electronic apparatus according to the embodiment of the present disclosure shoot a still image.

Next, a description will be given of a driving method when the electronic apparatus 50 according to the present embodiment shoots a still image. FIG. 8 is a timing chart when the solid-state image-capture device 1 according to the present embodiment shoots a still image. Operations (1) to (12) in FIG. 8 correspond to operations (1) to (12) in FIGS. 6 and 7. In the present embodiment, for still-image shooting, the mechanical shutter 61 included in the electronic apparatus 50 is used.

Next, in a state in which the mechanical shutter 61 is opened, the first reset pulses Drn1 and Drn2 are simultaneously supplied in all of the pixels (operation (2) in FIG. 8), so that only the first reset transistors 11 are turned on. Thereafter, the supply of the first reset pulses Drn1 and Drn2 is simultaneously stopped in all of the pixels (operation (3) in FIG. 8), so that the first reset transistors 11 are turned off. As a result, the electronic shutter operations are simultaneously performed in all of the pixels, so that an exposure period is started. Upon start of the exposure period, signal charges are generated and accumulated in the photodiodes PD1 and PD2, as illustrated in operation (4) in FIG. 6.

Next, the mechanical shutter 61 is closed to simultaneously end the exposure periods of all of the pixels. That is, although the moving-image shooting employs the configuration in which the global transfer is performed to simultaneously end the exposure periods in all of the pixels, the still-image shooting employs the configuration in which the mechanical shutter 61 is closed to end the exposure periods.

After the mechanical shutter 61 is closed, rolling readout is started. In the rolling readout, readout operations are sequentially performed row by row. In an operation of a readout row, the signal of the first pixel 40a is first read out. For readout of the first pixel 40a, the signal charge accumulated in the photodiode PD1 is read out as a high-luminance signal and a low-luminance signal, as in operation (5) in FIG. 6 to operation (12) in FIG. 7 for the moving-image driving method.

While the signal charge in the first pixel 40a is read out, the signal charge generated and accumulated by the photodiode PD2 in the second pixel 40b remains accumulated in the photodiode PD2.

When the readout of the first pixel 40a is completed, the readout of the second pixel 40b is performed. The readout of the second pixel 40b is performed as in operation (5) in FIG. 6 to operation (12) in FIG. 7 for the moving-image shooting. For the still-image shooting, the signal-charge transfer to and readout from the first and second charge accumulation sections 24 and 25 are sequentially performed in the pixels that share the multiple pixel transistors.

For the still-image shooting, since operations (4) in FIG. 6 to operation (8) in FIG. 7 are also incorporated into the readout operation for each row, the reset signal in each readout pixel can also be received by the column circuit. As a result, it is also possible to determine a difference between the high-luminance signal and the reset signal obtained in operation (6) in FIG. 8, not the reset signal obtained in operation (10) in FIG. 8.

In the present embodiment, the signal-charge transfer to and readout from the first and second charge accumulation sections 24 and 25 are sequentially performed in the first pixel 40a and the second pixel 40b that share the multiple pixel transistors, so that the signal charges in the pixels do not mix in the second charge accumulation section 25. Furthermore, in the present embodiment, since the mechanical shutter 61 is used to mechanically end the exposure period, incident light is mechanically shut off after the mechanical shutter 61 is closed. As a result, during the rolling readout of one pixel, signal charges can be accumulated in the photodiodes PD1 and PD2 until they are read out from the pixels. In the present embodiment, the mechanical shutter 61 is used for only determining the timing of ending the exposure period. Thus, the mechanical shutter 61 used in the present embodiment may be a simple mechanical shutter, compared to a high-precision mechanical shutter for determining the start and end of the exposure period.

[1-6. Layout of Pixels]

In the present embodiment, during the moving-image shooting, the signals of the pixels that share the second charge accumulation section 25 are output in a mixed manner. Therefore, the pixels that share the second charge accumulation section 25 are pixels for light of the same color.

Figure 9A:
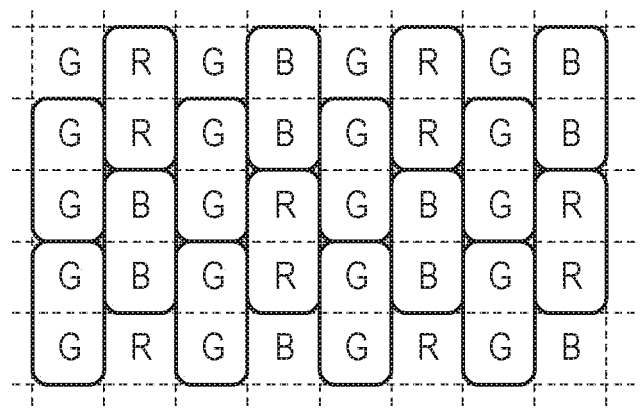
FIG. 9A illustrates one example of an actual pixel array that is applicable to the solid-state image capture device according to the embodiment of the present disclosure and FIG. 9B illustrates an effective pixel array when signal charges in sharing pixels in the actual pixel array in are added.
Figure 9B:
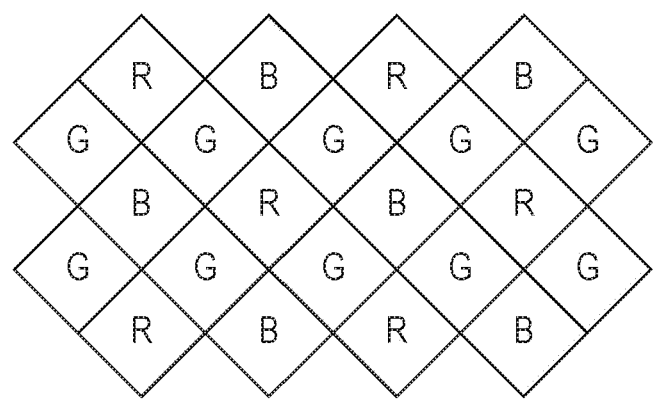

FIG. 9A illustrates one example of an actual pixel array that is applicable to the present embodiment and FIG. 9B illustrates an effective pixel array when signal charges in the sharing pixels in the actual pixel array in FIG. 9A are added. FIG. 9A illustrates an example in which red pixels (R), blue pixels (B), and green pixels (G) are arranged. As illustrated in FIG. 9A, the pixels in odd-numbered columns are constituted by green pixels and the pixels in even-numbered columns are constituted by red pixels and blue pixels that are alternately arranged every two rows. The two adjacent same-color pixels of the pixels in each column share the corresponding second charge accumulation section (i.e., the second charge accumulation section 25 in FIG. 4).

With this arrangement, when the pixel addition is performed for moving-image shooting, the signal charges in the two adjacent same-color pixels are read out at once. In this case, since the sharing pixels have the same color, no color mixing occurs. Since the same-color pixels share the multiple pixel transistors including the second charge accumulation section 25, the number of pixels is reduced but is still sufficient for moving-image shooting. In addition, since the exposure period during moving-image shooting can be set for each pixel, the dynamic range in a diagonal Bayer arrangement at 45 degrees can be increased by making the exposure times of the signal charges the two sharing pixels differ from each other.

Although FIG. 9A illustrates a case in which the pixel array for moving-image shooting has a diagonal Bayer arrangement, the array illustrated in FIG. 9A may be rotated by 45 degrees so that the array illustrated in FIG. 9B has a Bayer arrangement.

Figure 10:
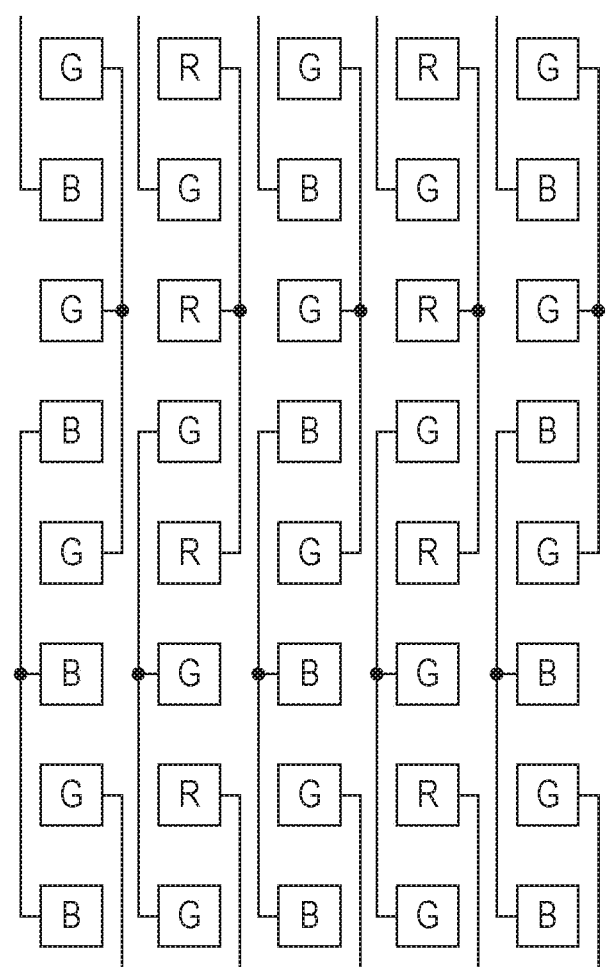
FIG. 10 illustrates an example of a pixel array that is applicable to a case in which three pixels share a second charge accumulation section and multiple pixel transistors.

Although an example in which two pixels share the second charge accumulation section 25 and the multiple pixel transistors has been described in the present embodiment, three or more pixels may share the second charge accumulation section 25 and the multiple pixel transistors. FIG. 10 illustrates an example of a pixel array that is applicable to a case in which three pixels share the second charge accumulation section 25 and the multiple pixel transistors.

As illustrated in FIG. 10, it is assumed that the pixel array is a typical Bayer arrangement and three same-color pixels that are adjacent in the vertical direction (i.e., in the column direction) constitute a sharing unit. That is, the pixels coupled by lines in FIG. 10 represent the sharing pixels.

In the present embodiment, since the sharing pixels are constituted by the same-color pixels, signals of different-color pixels are not added during moving-image shooting. In the arrangement illustrated in FIG. 10, when addition of the pixels in the three columns in the horizontal direction (i.e., the row direction) is performed using a column circuit or the like in conjunction with the addition of the three pixels in the vertical direction, a Bayer arrangement having one-ninth the number of pixels can be re-configured. In this case, when the number of pixels is assumed to be about 18 million pixels, it is possible to shoot a moving image with 2 million pixels, which is still sufficient for moving-image shooting.

As described above, in the present embodiment, the use of the mechanical shutter 61 allows the solid-state image capture device having a pixel-sharing structure in which the multiple pixels share the multiple pixels transistors to shoot a moving image and a still image by using a global shutter. In the present embodiment, since a high precision, high cost mechanical shutter is not used, the cost can be reduced.

Although the present embodiment has been described in conjunction with a configuration in which the solid-state image-capture device 1 having the first charge accumulation sections 24 with the CCD structure and the second charge accumulation section 25 is used to obtain a high-luminance signal and a low-luminance signal, the present disclosure is not limited thereto. For example, a similar driving method can also be applied to a solid-state image capture device having a configuration that does not have the first charge accumulation section 24 with the CCD structure and that temporarily stores a signal charge for the global shutter by using only the second charge accumulation section 25. A description below will be given of a case in which such a solid-state image capture device that has no charge accumulation section with a CCD-structure is applied to an electronic apparatus according to an embodiment of the present disclosure.

2. Second Embodiment

Electronic Apparatus and Solid-State Image Capture Device

Figure 11:
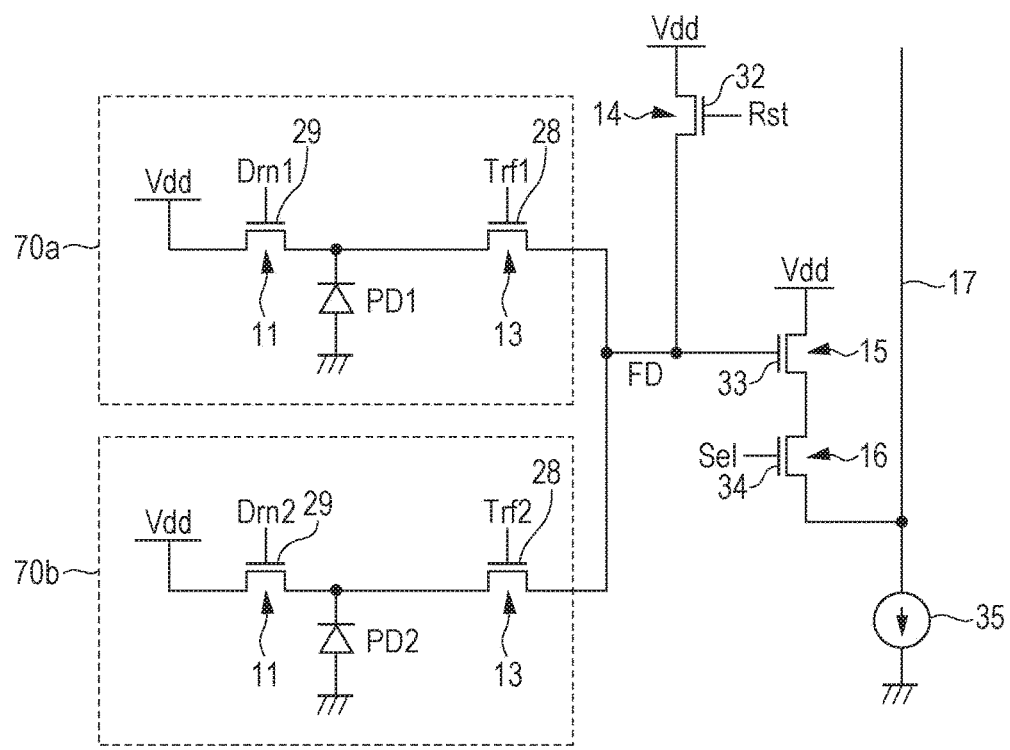
FIG. 11 illustrates a circuit configuration of a solid-state image capture device included in an electronic apparatus according to a second embodiment of the present disclosure.

FIG. 11 illustrates a circuit configuration of a solid-state image capture device that is applied to an electronic apparatus according to a second embodiment. The solid-state image-capture device according to the second embodiment is an example in which charge accumulation sections with a CCD structure are not formed in the solid-state image capture device according to the first embodiment. In FIG. 11, sections corresponding to those in FIG. 3 are denoted by the same reference numerals and redundant descriptions are not given hereinafter. Since the configuration of the electronic apparatus according to the second embodiment is substantially the same as the configuration illustrated in FIG. 1 and the overall configuration of the solid-state image capture device is substantially the same as the configuration in FIG. 2, those configurations are not illustrated and redundant descriptions are not given hereinafter. That is, the solid-state image capture device according to the present embodiment is also applied to the electronic apparatus illustrated in FIG. 1.

The solid-state image capture device according to the present embodiment is one example in which charge accumulation sections with a CCD structure are not formed in the solid-state image capture device according to the first embodiment, and the photodiodes PD1 and PD2 are connected to the sources of the transfer transistors 13.

Figure 12:
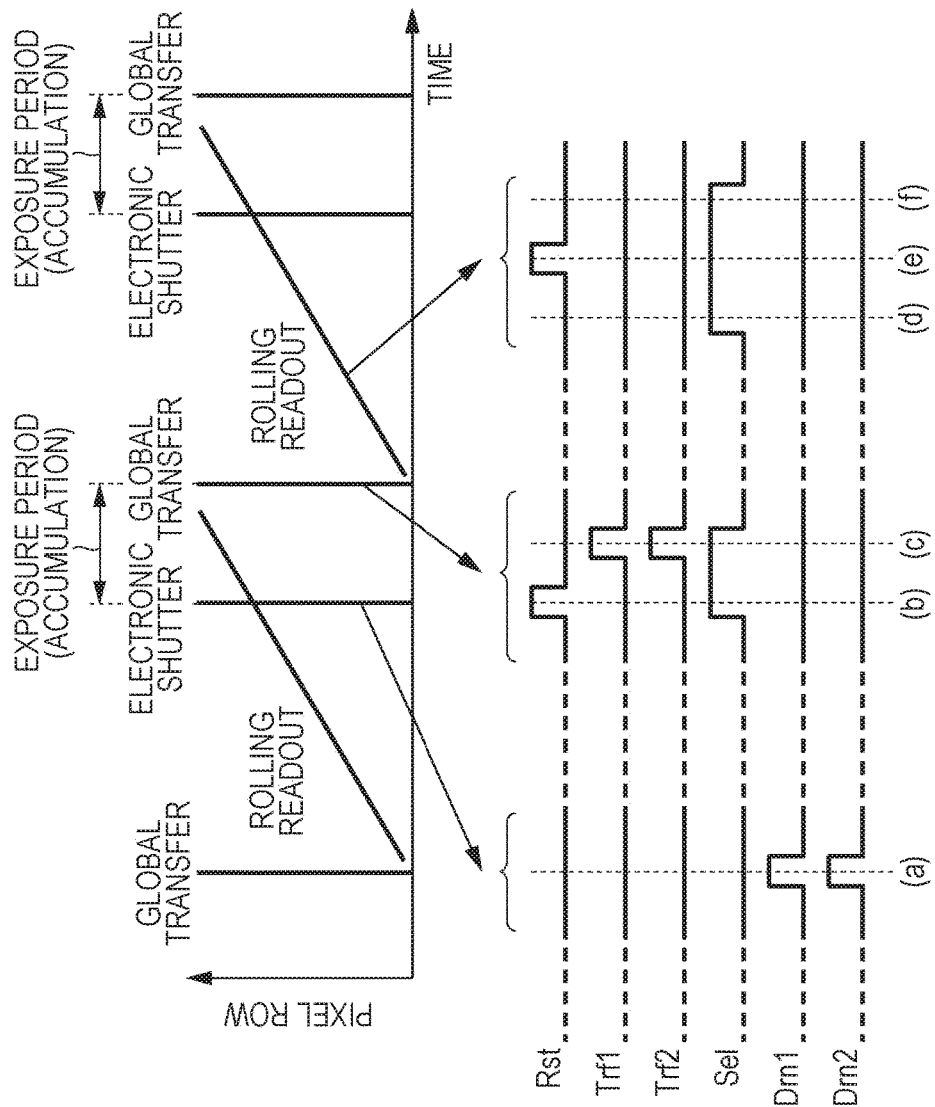
FIG. 12 is a timing chart for a case in which the electronic apparatus according to the second embodiment of the present disclosure shoot a moving image.

FIG. 12 is a timing chart when the electronic apparatus according to the present embodiment shoots a moving image.

For moving-image shooting, first, first reset pulses Drn1 and Drn2 are simultaneously supplied ((a) in FIG. 12), so that the first reset transistors 11 are turned on. As a result, the signal charges accumulated in the photodiodes PD1 and PD2 are discharged and they are reset. Thereafter, the supply of the first reset pulses Drn1 and Drn2 is stopped, so that exposures at the photodiodes PD1 and PD2 are started.

Next, the second reset pulse Rst and the selection pulse Sel are supplied ((b) in FIG. 12), so that the second reset transistor 14 and the selection transistor 16 are turned on to thereby reset the floating diffusion FD. Thereafter, the supply of the second reset pulse Rst is stopped and the transfer pulses Tr1 and Tr2 are supplied ((c) in FIG. 12). As a result, the signal charges accumulated in the photodiodes PD1 and PD2 are transferred to the floating diffusion FD.

The above-described series of operations is simultaneously performed at all of the pixels including a first pixel 70a and a second pixel 70b. Next, rolling readout is performed.

When the turn of the corresponding row comes, the selection pulse Sel is first supplied ((d) in FIG. 12) to turn on the selection transistor 16. Thus, the amplification transistor 15 amplifies an output corresponding to the potential of the signal charge accumulated in the floating diffusion FD and outputs the amplified output to the corresponding vertical signal line 17 via the selection transistor 16.

Next, the second reset pulse Rst is supplied to turn on the second reset transistor 14 ((e) in FIG. 12). As a result, the signal charge accumulated in the floating diffusion FD is discharged and it is reset. Next, in a state in which the supply of the second reset pulse Rst is stopped ((f) in FIG. 13), the output corresponding to the potential of the floating diffusion FD is received by the column circuit as a reset signal. The column circuit determines a difference between the previously received pixel signal and the reset signal. As a result, the column circuit holds a new pixel signal from which fixed-pattern noise was removed.

For the moving-image shooting in the present embodiment, the first and second pixels 70a and 70b are simultaneously driven, so that the signal charges stored in the two pixels are added and the resulting signal charge is read out as a pixel signal for a substantially single pixel.

FIG. 13 is a timing chart when the electronic apparatus according to the present embodiment shoots a still image. In the present embodiment, for shooting a still image, the mechanical shutter 61 illustrated in FIG. 1 is also used.

In a state in which the mechanical shutter 61 is opened, the first reset pulses Drn1 and Drn2 are simultaneously supplied to thereby turn on the first reset transistors 11 ((a) in FIG. 13). As a result, the signal charges accumulated in the photodiodes PD1 and PD2 are discharged and they are reset. Thereafter, the supply of the first reset pulses Drn1 and Drn2 is stopped, so that exposures at the photodiodes PD1 and PD2 are started.

Next, the mechanical shutter 61 is closed to simultaneously end the exposure periods of all of the pixels. Next, rolling readout is performed. In the solid-state image capture device according to the present embodiment, in the rolling readout, the signal charges remain accumulated in the photodiodes PD1 and PD2 until the turn of the corresponding row comes.

When the turn of the corresponding row comes, the second reset pulse Rst and the selection pulse Sel are first supplied ((g) in FIG. 13) to turn on the second reset transistor 14 and the selection transistor 16. As a result, the potential of the floating diffusion FD is reset.

Next, in the state in which the supply of the second reset pulse Rst is stopped ((h) in FIG. 13), an output corresponding to the potential of the floating diffusion FD is received by the column circuit as a reset signal.

Next, the transfer pulse Trf1 is supplied ((i) in FIG. 13), so that the transfer transistor 13 in the first pixel 70*a* is turned on. As a result, the signal charge accumulated in the photodiodes PD1 is transferred to the floating diffusion FD.

Next, in the state in which the supply of the transfer pulse Trf1 ((j) in FIG. 13) is stopped, the amplification transistor 15 amplifies an output corresponding to the potential of the signal charge accumulated in the floating diffusion FD and outputs the amplified output to the vertical signal line 17 via the selection transistor 16. As a result, the signal charge generated and accumulated by the first pixel 70*a* is received by the column circuit as a pixel signal. The column circuit then determines a difference between the pixel signal and the reset signal received in state (h) in FIG. 13. As a result, the column circuit holds a new pixel signal from which fixed-pattern noise and reset noise were removed.

After the readout of the signal charge in the first pixel 70*a* is ended, the signal charge in the second pixel 70*b* is read out. The readout of the signal charge in the second pixel 70*b* is performed in the same manner as in the first pixel 70*a*, so that a pixel signal can be obtained.

In the present embodiment, when a mechanical shutter is employed for a solid-state image capture device having a pixel-sharing system in the manner described above, moving-image shooting and still-image shooting can be actually performed with a global shutter.

It is also possible to provide advantages that are similar to those of the first embodiment.

The application of the present disclosure is limited not only to solid-state image capture devices that capture images by detecting distribution of the amount of incident visible light, but also to solid-state image capture devices that capture distribution of the amount of infrared, X rays, particles, or the like as images. In a broad sense, the present disclosure is applicable to solid-state image capture devices (physical-quantity-distribution detecting devices), such as a fingerprint detection sensor that captures images by converting distribution of other physical quantities, such as a pressure and an electrostatic capacitance, into charges.

Additionally, the present disclosure is not limited to solid-state image capture devices that sequentially scan the unit pixels in the pixel region row by row to read out pixel signals from the unit pixels. The present disclosure is also applicable to an X-Y address solid-state image capture device that selects arbitrary pixels pixel by pixel and reads out signals from the selected pixels pixel by pixel.

The solid-state image capture device may take a form of one chip or may take an image-capture-function-equipped modular form in which a pixel region and a signal processing section or an optical system is packaged.

Although the electronic apparatus according to the embodiment of the present disclosure has been described above in conjunction with an example of a camera, the electronic apparatus may be any image-capture-function-equipped electronic apparatus, such as a mobile phone, as well as camera systems, such as a digital still camera and a video camera. The electronic apparatus may also have the above-described modular form, i.e., a camera module.

Although a configuration including n-channel MOS transistors has been mainly described in the above example, a configuration including p-channel MOS transistors may also be used. For a configuration including p-channel MOS transistors, the conductive types are opposite to those illustrated in the figures.

The present disclosure may have a configuration as described below.

(1) An electronic apparatus including:

a pixel array section in which pixels are two-dimensionally arranged in a matrix, the pixels including photoelectric conversion sections that generate signal charges corresponding to amounts of light, charge accumulation sections that receive the signal charges from the corresponding photoelectric conversion sections and that are shared by the corresponding photoelectric conversion sections, and pixel transistors that read out the signal charges generated by the corresponding photoelectric conversion sections and that are shared by the corresponding photoelectric conversion sections;

a solid-state image capture device including a scanner that is capable of driving the pixels so that exposure periods of all of the pixels are simultaneously started, that is capable of driving the pixels so that the exposure periods of all of the pixels are simultaneously ended, and that sequentially selects and scans the pixels in readout periods; and a mechanical shutter that determines an end of the exposure periods for still-image shooting.

(2) The electronic apparatus according to (1), wherein the photoelectric conversion sections that share the corresponding pixel transistors photoelectrically convert light of corresponding same color.

(3) The electronic apparatus according to (2), wherein, in the pixel array section, a column in which the pixels that photoelectrically convert green light are arranged and a column in which the two pixels that photoelectrically convert red light and the two pixels that photoelectrically convert blue light are alternately arranged in a column direction are alternately arranged, and the two same-color pixels that are adjacent to each other in the column direction share the corresponding charge accumulation section.

(4) The electronic apparatus according to (1), wherein each pixel has a temporary charge holding section, provided between the photoelectric conversion section and the charge accumulation section, for the corresponding photoelectric conversion section, and when the exposure period is ended, the signal charge generated by the photoelectrical conversion section is transferred to the temporary charge holding section and signal charge exceeding an amount of saturation charge of the temporary charge holding section is transferred to the charge accumulation section.

(5) The electronic apparatus according to (2), wherein the pixels have a Bayer arrangement, and the same color pixels that are adjacent in the column direction share the corresponding charge accumulation section.

(6) A driving method for an electronic apparatus including
a pixel array section in which pixels are two-dimensionally arranged in a matrix, the pixels including photoelectric conversion sections that generate and accumulate signal charges corresponding to amounts of light, pixel transistors that transfer and read out the signal charges accumulated by the corresponding photoelectric conversion sections, and charge accumulation sections that are shared by the corresponding photoelectric conversion sections,
a solid-state image capture device including a scanner that is capable of driving the pixels so that exposure periods of all of the pixels are simultaneously started, that is capable of driving the pixels so that the exposure periods of all of the pixels are simultaneously ended, and that sequentially selects and scans the pixels in readout periods, and
a mechanical shutter that determines an end of the exposure periods for still-image shooting, the driving method including:
simultaneously starting the exposure periods of all of the pixels by discharging the signal charges accumulated by the photoelectric conversion sections and simultaneously ending the exposure periods of all of the pixels by transferring the signal charges generated and accumulated by the photoelectric conversion sections in the exposure periods to the corresponding charge accumulation sections, to perform moving-image shooting; and
simultaneously starting the exposure periods of all of the pixels by discharging the signal charges accumulated by the photoelectric conversion sections and ending the exposure periods of all of the pixels by closing the mechanical shutter, to perform still-image shooting.

(7) The driving method according to (6), wherein the photoelectric conversion sections that share the corresponding charge accumulation section photoelectrically convert light of corresponding same color and, for the moving-image shooting, the signal charges in the same-color pixels that share the corresponding charge accumulation section are simultaneously read out.

(8) The driving method according to (7), wherein, in the pixel array section, a column in which the pixels that photoelectrically convert green light are arranged and a column in which the two pixels that photoelectrically convert red light and the two pixels that photoelectrically convert blue light are alternately arranged in a column direction are alternately arranged;
the two same-color pixels that are adjacent to each other in the column direction share the corresponding charge accumulation section; and
for the moving-image shooting, the signal charges in the same-color pixels that share the corresponding charge accumulation section are simultaneously read out.

(9) The driving method according to (7), wherein each pixel has a temporary charge holding section between the photoelectric conversion section and the charge accumulation section;
after the exposure period is ended, the signal charge generated by the photoelectrical conversion section is transferred to the corresponding temporary charge holding section and signal charge exceeding an amount of saturation charge of the temporary charge holding section is transferred to the charge accumulation section; and
during the readout of the signal charge in each pixel, the signal charge accumulated by the charge accumulation section is read as a high-luminance signal and the signal charge accumulated in the temporary charge holding section is read as a low-luminance signal.

(10) The driving method according to (7), wherein the pixels have a Bayer arrangement;
the same color pixels that are adjacent in the column direction share the corresponding charge accumulation section; and
for the moving-image shooting, the signal charges in the same-color pixels that share the corresponding charge accumulation section are simultaneously read out.

The present disclosure contains subject matter related to that disclosed in Japanese Priority Patent Application JP 2011-137653 filed in the Japan Patent Office on Jun. 21, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An electronic device comprising:
a solid-state device including
a pixel array unit including pixels two-dimensionally arranged in a matrix form, the pixels respectively including a photoelectric conversion unit that generates a signal charge according to an amount of light, a charge accumulation unit that receives the signal charge from the photoelectric conversion unit and is shared between a plurality of photoelectric conversion units, and a plurality of pixel transistors each of which reads the signal charge generated by the photoelectric conversion unit and is shared between the plurality of photoelectric conversion units, and
a scanning circuit capable of driving the pixels during an exposure period in a manner that the exposure period concurrently begins for all of the pixels, capable of driving the pixels in a manner that the exposure period also concurrently terminates for all of the pixels, and configured to selectively scan the pixels in order during a reading period; and
a mechanical shutter configured to decide when the exposure period terminates in capturing a still image,
wherein, in capturing a moving image, the scanning circuit is configured to drive the pixels during the exposure period in a manner that the exposure period for a first frame begins before the reading period for a second frame immediately preceding the first frame terminates, the reading period including a first readout for a signal level followed by a second readout for a reset level,
wherein the plurality of photoelectric conversion units that share the pixel transistors are configured to photoelectrically convert light of a same color,
wherein columns including pixels for photoelectrically converting green light and columns on which pixels for photoelectrically converting red light and pixels for photoelectrically converting blue light are arranged in a column direction, are alternately arranged on the pixel array unit,
wherein the charge accumulation unit is shared between two pixels of a same color adjacent to each other in the column direction,
wherein the pixels respectively include, for each of the photoelectric conversion units, a temporary charge retaining unit between the photoelectric conversion unit and the charge accumulation unit, wherein the signal charge generated by the photoelectric conversion unit is transferred to the temporary charge retaining unit, and a signal charge exceeding a saturation charge amount of the temporary charge retaining unit is transferred to the charge accumulation unit after the exposure period terminates, and wherein a signal charge accumulated by the charge accumulation unit is read as a high-illuminance signal, and a signal charge accumulated by the temporary charge retaining unit is read as a low-illuminance signal when the signal charge generated by the photoelectric conversion unit is read for each pixel.

2. The electronic device according to claim 1, wherein the mechanical shutter is closed to terminate the exposure period in capturing the still image.

3. The electronic device according to claim 1, wherein the mechanical shutter is not employed in capturing the moving image.

4. The electronic device according to claim 1, wherein the scanning circuit is configured to sequentially scan the pixels row by row during the reading period.

5. The electronic device according to claim 1, wherein the scanning circuit is configured to scan arbitrary pixels pixel by pixel during the reading period.

6. The electronic device according to claim 1, wherein the plurality of pixel transistors includes a reset transistor, an amplification transistor, and a selection transistor.

7. The electronic device according to claim 6, wherein the charge accumulation unit is directly connected to a gate of the amplification transistor.

8. The electronic device according to claim 1, wherein the plurality of pixel transistors is a plurality of NMOS transistors.

9. A method for driving an electronic device, the electronic device including a solid-state imaging device including
a pixel array unit including pixels two-dimensionally arranged in a matrix form, the pixels including a photoelectric conversion unit that generates a signal charge according to an amount of light, a plurality of pixel transistors each of which transfers and reads the signal charge accumulated by the photoelectric conversion unit, and a charge accumulation unit that is shared between the plurality of photoelectric conversion units, and a scanning circuit capable of driving the pixels during an exposure period in a manner that the exposure period concurrently begins for all of the pixels, and capable of driving the pixels in a manner that the exposure period also concurrently terminates for all of the pixels, and configured to selectively scan the pixels in order during a reading period, the scanning circuit configured to, in capturing a moving image, drive the pixels during the exposure period in a manner that the exposure period for a first frame begins before the reading period for a second frame immediately preceding the first frame terminates, the reading period including a first readout for a signal level followed by a second readout for a reset level, and a mechanical shutter configured to decide when the exposure period terminates in capturing a still image, the method comprising:

configuring the plurality of photoelectric conversion units to photoelectrically convert light of a same color, the plurality of photoelectric conversion units sharing the charge accumulation unit, alternately arranging columns including pixels for photoelectrically converting green light and columns on which pixels for photoelectrically converting red light and pixels for photoelectrically converting blue light are arranged in a column direction on the pixel array unit, sharing the charge accumulation unit between two pixels of a same color adjacent to each other in the column direction, concurrently beginning an exposure period for all of the pixels in capturing a moving image by discharging the signal charge accumulated by the photoelectric conversion unit, concurrently terminating the exposure period for all of the pixels by transferring the signal charge generated and accumulated by the photoelectric conversion unit during the exposure period to the charge accumulation unit, and concurrently reading a signal charge of a pixel of a same color that shares the charge accumulation unit, and concurrently beginning the exposure period for all of the pixels in capturing a still image by discharging the signal charge accumulated by the photoelectric conversion unit, and concurrently terminating the exposure period for all of the pixels by closing the mechanical shutter, wherein the pixels respectively include, for each pixel, a temporary charge retaining unit between the photoelectric conversion unit and the charge accumulation unit, wherein the signal charge generated by the photoelectric conversion unit is transferred to the temporary charge retaining unit, and a signal charge exceeding a saturation charge amount of the temporary charge retaining unit is transferred to the charge accumulation unit after the exposure period terminates, and wherein a signal charge accumulated by the charge accumulation unit is read as a high-illuminance signal, and a signal charge accumulated by the temporary charge retaining unit is read as a low-illuminance signal when the signal charge generated by the photoelectric conversion unit is read for each pixel.

10. The method for driving the electronic device according to claim 9, wherein the mechanical shutter is closed to terminate the exposure period in capturing the still image.

11. The method for driving the electronic device according to claim 9, wherein the mechanical shutter is not employed in capturing the moving image.

12. The method for driving the electronic device according to claim 9, wherein the scanning circuit is configured to sequentially scan the pixels row by row during the reading period.

13. The method for driving the electronic device according to claim 9, wherein the scanning circuit is configured to scan arbitrary pixels pixel by pixel during the reading period.

14. The method for driving the electronic device according to claim 9, wherein the plurality of pixel transistors includes a reset transistor, an amplification transistor, and a selection transistor.

15. The method for driving the electronic device according to claim 14, wherein the charge accumulation unit is directly connected to a gate of the amplification transistor.

16. The method for driving the electronic device according to claim 9, wherein the plurality of pixel transistors is a plurality of NMOS transistors.

* * * * *

UNITED STATES PATENT AND TRADEMARK OFFICE
CERTIFICATE OF CORRECTION

PATENT NO. : 10,044,947 B2
APPLICATION NO. : 15/152349
DATED : August 7, 2018
INVENTOR(S) : Keiji Mabuchi It is certified that error appears in the above-identified patent and that said Letters Patent is hereby corrected as shown below:

On the Title Page

Item (56) Other Publications:
Column 2, Line 18 please replace "Feb. 24, 2017," with --Feb. 14, 2017--

Signed and Sealed this
Second Day of October, 2018

Andrei Iancu
*Director of the United States Patent and Trademark Office*